(12) United States Patent
Compton et al.

(10) Patent No.: US 7,962,791 B2
(45) Date of Patent: Jun. 14, 2011

(54) APPARATUS, SYSTEM, AND METHOD FOR AUTOMATED ERROR DETERMINATION PROPAGATION

(75) Inventors: Matthew Charles Compton, Durham, NC (US); Louis Daniel Echevarria, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/203,686

(22) Filed: Sep. 3, 2008

(65) Prior Publication Data

US 2010/0058117 A1    Mar. 4, 2010

(51) Int. Cl.
*G06F 11/00*    (2006.01)
(52) U.S. Cl. .............................. 714/26; 714/48; 714/57
(58) Field of Classification Search .................. None
See application file for complete search history.

(56) References Cited

U.S. PATENT DOCUMENTS

| | | | |
|---|---|---|---|
| 4,422,158 A | 12/1983 | Galie | |
| 6,324,659 B1 | 11/2001 | Pierro | |
| 6,650,949 B1 | 11/2003 | Fera et al. | |
| 6,721,685 B2 | 4/2004 | Kodama | |
| 6,754,704 B1 | 6/2004 | Prorock | |
| 7,002,914 B2 | 2/2006 | Cloonan | |
| 7,043,505 B1 | 5/2006 | Teague et al. | |
| 7,225,368 B2 | 5/2007 | Lancaster | |
| 7,287,193 B2 | 10/2007 | Ward | |
| 2003/0189930 A1 | 10/2003 | Terrell et al. | |
| 2004/0078724 A1* | 4/2004 | Keller et al. | 714/48 |
| 2004/0230873 A1* | 11/2004 | Ward | 714/39 |
| 2004/0255004 A1 | 12/2004 | Weseloh | |
| 2006/0070077 A1 | 3/2006 | Erlandson et al. | |
| 2008/0065577 A1* | 3/2008 | Chefalas et al. | 706/47 |
| 2008/0133435 A1* | 6/2008 | Chintalapti et al. | 706/12 |
| 2008/0320338 A1* | 12/2008 | Ward | 714/43 |
| 2010/0058117 A1 | 3/2010 | Compton et al. | |

* cited by examiner

*Primary Examiner* — Michael C Maskulinski
(74) *Attorney, Agent, or Firm* — Kunzler Needham Massey & Thorpe

(57) ABSTRACT

An apparatus, system, and method are disclosed for automated data determination propagation. A data package source collects data and compiles the data into data packages. A local data package prioritization module determines a prioritized order of the data packages based on a local priority matrix. The local data package prioritization module sends the data packages in the prioritized order over a temporary data connection to a central data package prioritization module. The local data package prioritization module updates the local priority matrix over the temporary data connection based on a central priority matrix. The central data package prioritization module receives the data packages and makes one or more updates to the central priority matrix based on the data packages.

19 Claims, 6 Drawing Sheets

APPARATUS, SYSTEM, AND METHOD FOR AUTOMATED ERROR DETERMINATION PROPAGATION

BACKGROUND OF THE INVENTION

1. Field of the Invention

This invention relates to data determination propagation and more particularly relates to automated data priority determination propagation.

2. Description of the Related Art

Many electronic and computer devices send data to a central data repository. A wide variety of data is sent to central repositories, such as error reports, status reports, statistical reports, transactional information, sensor readings, and the like. As the number of devices that send data packages to a central location increases, the number of data packages also increases. Some data packages may be urgent, requiring immediate attention, while others may require little or no attention at all.

Currently, many call home enabled devices have only limited connections to the central data repository. These devices may only have access to dialup connections, or may gather data packages from other call home enabled devices to send at one time. With either a slow connection, or with a large amount of data to transmit, more important data packages may be delayed while less important data packages are being transmitted. Even if call home enabled devices were to prioritize their call home packages, they only have access to the call home packages that they have collected, and cannot calculate a system-wide priority. The opportunity to load system-wide priorities traditionally only presents itself when microcode is loaded onto a call home enabled device. Loading microcode is typically an infrequent and often lengthy process.

Additionally, those wishing to access data packages within a central data repository often spend large amounts of time sifting through data packages searching for high priority data packages, or for previously identified data packages. Systems with many call home devices, or with years of call home data, make this manual searching nearly impossible. Even in situations where manual searching is possible, manual searches can miss critical information, and users may have differing opinions as to the priority or the severity of data. Manual searches through data packages waste time and allow important data to be missed.

SUMMARY OF THE INVENTION

From the foregoing discussion, it should be apparent that a need exists for an apparatus, system, and method that automatically propagate priority determinations. Beneficially, such an apparatus, system, and method would automatically update priority determinations and propagate the priority determinations from a central location to remote locations.

The present invention has been developed in response to the present state of the art, and in particular, in response to the problems and needs in the art that have not yet been fully solved by currently available call home systems. Accordingly, the present invention has been developed to provide an apparatus, system, and method for propagating data priority determinations that overcome many or all of the above-discussed shortcomings in the art.

The apparatus for data determination propagation is provided with a plurality of modules configured to functionally execute the necessary steps of data determination propagation. These modules in the described embodiments include an unsent data package module, a local data package order module, a data package transmission module, a local priority matrix update module, and a connection module.

The unsent data package module, in one embodiment, collects a plurality of data packages. In one embodiment, the local data package order module determines a prioritized order of the plurality of data packages based on a local priority matrix. In a further embodiment, the local data package order module arranges a subset of the plurality of data packages in order based on timestamps of the subset of the plurality of data packages in response to a determination that each data package in the subset of the plurality of data packages has an equal priority in the local priority matrix.

The data package transmission module, in one embodiment, sends the plurality of data packages in the prioritized order to a data package repository over a data connection. In one embodiment, the local priority matrix update module updates the local priority matrix based on one or more central priority matrix updates received over the data connection.

The connection module, in one embodiment, initiates the data connection to the data package repository in response to a transmission request from the data package transmission module. In another embodiment, the connection module closes the data connection in response to a completed communication by the local priority matrix update module. The data connection, in a further embodiment, comprises an analog modem connection.

Another apparatus for data determination propagation is provided with a plurality of modules configured to functionally execute the necessary steps of data determination propagation. These modules in the described embodiments include a data package receiver module, a priority matrix update module, an update broadcast module, a frequency module, a user access priority module, a user rating module, a last access module, and a priority override module.

The data package receiver module, in one embodiment, receives a plurality of data packages over a data connection from one or more data package sources. In a further embodiment, each of the data package sources send at least a subset of the plurality of data packages to the data package receiver module in a prioritized order based on a local priority matrix. In another embodiment, the data connection comprises a substantially constant data connection.

In one embodiment, the plurality of data packages comprises error reports and the prioritization of data package types comprises an error severity prioritization. At least one data package source from the plurality of data package sources, in one embodiment, comprises a dumper module configured to transmit data packages between servers in the prioritized order. In another embodiment, at least one data package source from the plurality of data package sources comprises an unpacker module configured to parse and unpack data packages in the prioritized order.

In one embodiment, the priority matrix update module updates a central priority matrix based on the plurality of data packages. The central priority matrix, in a further embodiment, comprises a prioritization of data package types. The update broadcast module, in one embodiment, sends updates from the priority matrix update module over the data connection to the plurality of data package sources as local priority matrix updates.

In one embodiment, the frequency module updates the central priority matrix based at least partially on a number of the plurality of data packages having a similar data package type. The user access priority module, in one embodiment, updates the central priority matrix based at least partially on a number of times that data packages of a similar data package type have been accessed by one or more users. In one embodiment, the user rating module updates the central priority matrix based at least partially on one or more user supplied data package priorities.

The last access module, in one embodiment updates the central priority matrix based at least partially on an amount of time that has transpired since a data package of a data package type has been accessed. In one embodiment, the priority override module updates the central priority matrix based at least partially on a user-provided override data package priority.

A system of the present invention is also presented for data determination propagation. The system may be embodied by a data package source, a local data package prioritization module, a central data package prioritization module, a data package repository, a secondary data package source, and a user interface.

The data package source, in one embodiment, collects call home data and compiles the call home data into call home packages. In one embodiment, the local data package prioritization module determines a prioritized order of the call home packages based on a local priority matrix. In another embodiment, the local data package prioritization module sends the call home packages in the prioritized order over a temporary data connection. The local data package prioritization module, in a further embodiment, updates the local priority matrix over the temporary data connection based on a central priority matrix.

The central data package prioritization module, in one embodiment, receives the call home packages. In another embodiment, the central data package prioritization module makes one or more updates to the central priority matrix based on the call home packages. The central data package prioritization module, in a further embodiment, broadcasts the one or more updates over the substantially constant data connection to the secondary data package source. In one embodiment, the data package repository stores the call home packages.

The secondary data package source, in one embodiment, determines a secondary prioritized order of at least a subset of the call home packages and one or more additional call home packages based on a second local priority matrix. In another embodiment, the secondary data package source performs an action on at least a subset of the call home packages and the additional call home packages in the secondary prioritized order. The secondary data package source, in a further embodiment, updates the second local priority matrix over a substantially constant data connection based on the central priority matrix. In one embodiment, the user interface provides a user access to the call home packages stored in the data package repository.

A method of the present invention is also presented for data determination propagation. The method, in the disclosed embodiment, substantially includes the steps of receiving a plurality of error records from one or more data package sources in a prioritized order based on a local priority matrix, determining whether an error record from the plurality of error records comprises a new error type, determining an error priority of the new error type, making one or more updates to a central priority matrix based on the error priority of the new error type, and sending the one or more updates to at least one of the one or more data package sources as local priority matrix updates. The method, in another embodiment, includes the step of receiving a local priority matrix update query from the at least one of the one or more data package sources.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
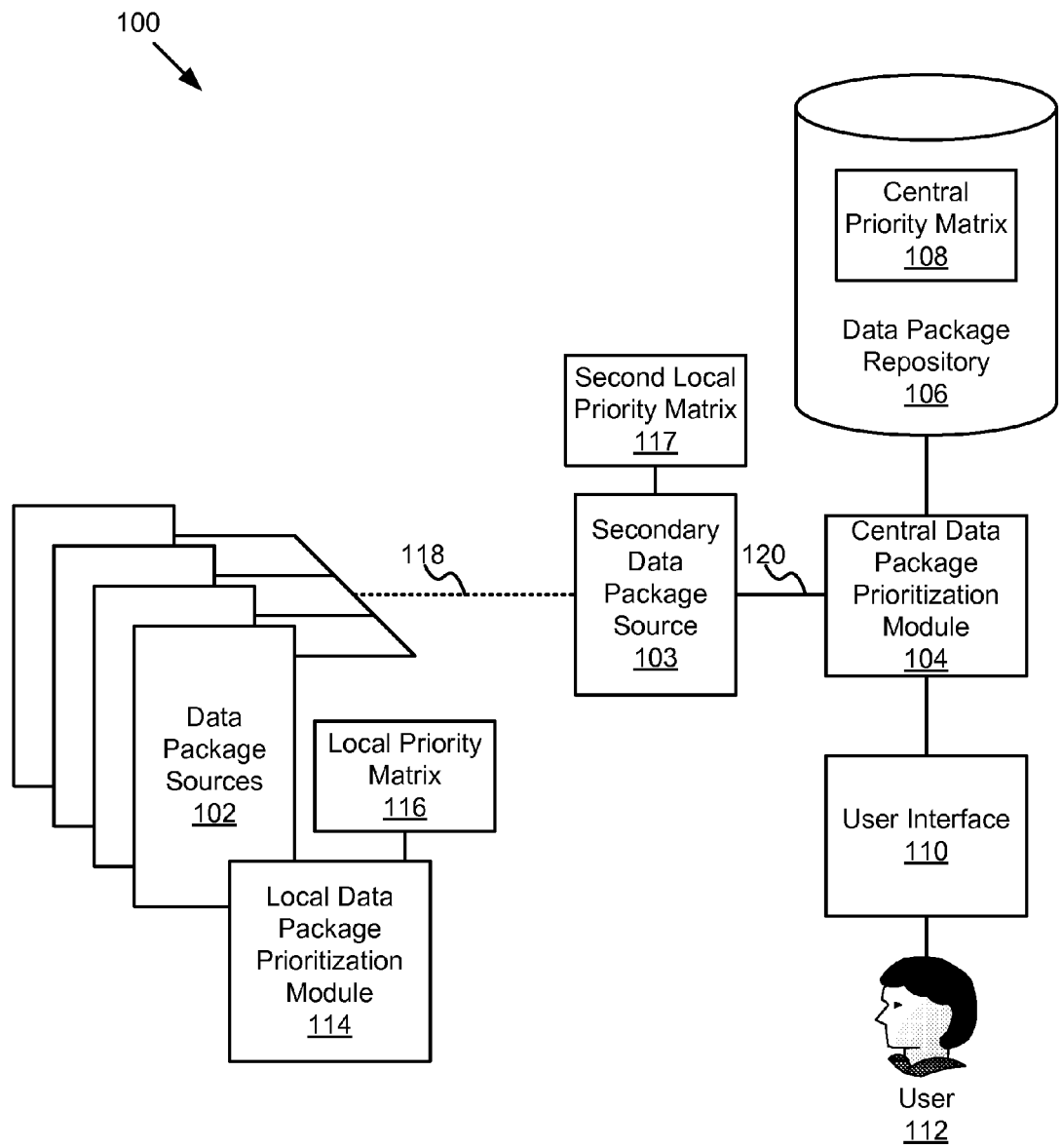
FIG. 1 is a schematic block diagram illustrating one embodiment of a system for automated data determination propagation in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for automated data determination propagation. In the depicted embodiment, the system 100 comprises one or more data package sources 102, a secondary data package source 103, a central data package prioritization module 104, a data package repository 106, a priority matrix 108, a user interface 110, a user 112, a local data package prioritization module 114, one or more local priority matrices 116, a temporary data connection 118, and a substantially constant data connection 120.

In one embodiment, the one or more data package sources 102 are configured to compile, collect, gather, transfer, or otherwise provide data packages. A data package, in one embodiment, may comprise a report, an update, a request, a status, or other data that is packaged for transmission over a network. A data package, in a further embodiment, may comprise a call home package that is transmitted from a remote system or device, such as the one or more data package sources 102, to a central system, device, repository, or the like. Data packages may comprise predefined formats to facilitate processing of the data packages by the central data package prioritization module 104. The one or more data package sources 102, in another embodiment, may collect data and compile the data into a data package, such as a call home package.

One example of a call home package is an error package or error report. A remote system, such as the data package sources 102, may send an error report to inform a central system, such as the central data package prioritization module 104 or a similar module, of an occurrence of an error. Error reports may comprise one or more of an error log, an error identifier, a system health report, a system online/offline status, a failed module identifier, or other error information. Some data packages, such as error reports, may vary in urgency and required responses, some having an extreme urgency and requiring an immediate response, while others may have minimal urgency and require little or no response. Data packages may be prioritized according to urgency, severity, importance, relevance, or other factors. The one or more data package sources 102, in one embodiment, may comprise one or more customers that send data packages to a central service provider, such as the central data package prioritization module 104.

The one or more data package sources 102, in one embodiment, send one or more data packages to the central data package prioritization module 104, either directly or indirectly through one or more secondary data package sources 103. Each of the data package sources 102 may send data packages individually, or alternatively, may group them together for transmission. For example, one or more of the one or more data package sources 102 may be designated to transmit data packages on behalf of others of the one or more data package sources 102. Accordingly, the one or more data package sources 102 may be in electrical communication with each other, or divided into subgroups that are in electrical communication with each other. The one or more data package sources 102, in one embodiment, may comprise computer systems such as personal computers (PCs) or servers, embedded systems or control systems, or other sources capable of generating and/or transmitting data packages. In one embodiment, the one or more data package sources 102 may send one or more data packages to the central data package prioritization module 104 in groups, for example at a specific interval or time, or when the one or more data package sources 102 accumulate a predetermined amount of data packages.

In the depicted embodiment, the data package sources 102 comprise a local data package prioritization module 114. In one embodiment, each of the one or more data package sources 102 comprises an individual local data package prioritization module 114. The local data package prioritization module 114 is described in greater detail with regard to the local data package prioritization module 200 of FIG. 2. In general, the local data package prioritization module 114 receives, collects, and/or gathers a plurality of data packages, determines a prioritized order of the plurality of data packages based on a local priority matrix 116, sends the plurality of data packages in the prioritized order to the data package repository 106 over a data connection 118, 120, and updates the local priority matrix 116 based on one or more updates to the central priority matrix 108 that the local data prioritization module 114 receives over the data connection 118, 120. In one embodiment, the local data package prioritization module 114 may send the plurality of data packages to the data package repository 106 through one or more other devices and/or modules, such as the secondary data package source 103 and the central data package prioritization module 104. In one embodiment, the local priority matrix 116 comprises a prioritization of data package types, and may be a local copy or a customized copy of the central priority matrix 108 described below.

In one embodiment, the data package sources 102, and accordingly the local data package prioritization module 114, are in electrical communication with the secondary data package source 103 and/or the central data package prioritization module 104 over a temporary data connection 118. Connecting through the temporary data connection 118 may increase security of the data package sources 102, lower costs, decrease bandwidth usage, or satisfy customer preferences. In one embodiment, the temporary data connection 118 comprises an analog modem connection or dial-up connection. In a further embodiment, the temporary data connection 118 comprises a temporary connection over a substantially constant connection type, such as a digital subscriber line (DSL) connection, a cable modem connection, a T1 connection, a wireless connection, an Ethernet connection, or the like, that the data package sources use temporarily for data package transmissions. In another embodiment, the data package sources 102 are configured to initiate the temporary data connection 118, but to refuse incoming data connection requests.

In the depicted embodiment, the secondary data package source 103 is disposed in the data path between the data package sources 102 and the data package repository 106. In one embodiment, the secondary data package source 103 is substantially similar to the data package sources 102. The secondary data package source 103, in one embodiment, receives data packages from multiple data package sources 102, and/or from multiple groups of data package sources 102. The secondary data package source 103, in a further embodiment, prioritizes data packages from the data package sources 102, such as call home packages or the like, together with one or more additional data packages to form a secondary prioritized order of data packages. The additional data packages may comprise data packages received from other data package sources, data packages previously received and queued, and the like. The secondary data package source 103, in one embodiment, bases the secondary prioritized order on a second local priority matrix 117. In a further embodiment, the secondary data package source 103 determines a secondary prioritized order of a subset of the data package from the data package sources 102 and the additional data packages. The subset may comprise data packages having one or more predefined data package types, data packages from one or more predefined data package sources, or data packages having one or more other common attributes.

In one embodiment, the secondary data package source 103 is configured to perform an action on the data packages in the secondary prioritized order. The secondary data package source 103 may comprise a dumper module that transmits the data packages in the secondary prioritized order between servers within the system 100, or an unpacker module that parses and unpacks the data packages in the secondary prioritized orders. As described above, the secondary data package source 103 may perform the action on a subset of the data packages from the data package sources 102 and the additional data packages, or on each of the data packages from the data package sources 102 and the additional data packages. In one embodiment, the system 100 comprises a plurality of secondary data package sources 103 configured to perform actions on data packages either in serial or in parallel along the data path from the data package sources 102 to the data package repository 106. In a further embodiment, the central data package prioritization module 104 may comprise a secondary data package source, such as an unpacker module or the like.

In the depicted embodiment, the secondary data package source 103 is in electrical communication with the data package repository 106 through the central data package prioritization module 104 over a substantially constant data connection 120. The substantially constant data connection 120, in one embodiment, may comprises a DSL connection, a cable modem connection, a T1 connection, a wireless connection, an Ethernet connection, or the like. In one embodiment, the substantially constant data connection 120 allows the central data package prioritization module 104 to broadcast or otherwise send priority matrix updates to the secondary data package source, such that the secondary data package source 103 may update the second local priority matrix 117. In one embodiment, the secondary data package source 103 is configured to receive an incoming connection or broadcast from the central data package prioritization module 104. In a further embodiment, the data package sources 102 may also be connected to the central data package prioritization module 104 over the substantially constant data connection 120, and configured to receive incoming connections or broadcasts from the central data package prioritization module 104. The substantially constant connection 120, in one embodiment, allows the secondary data package source to update the second local priority matrix 117 based on a push broadcast from the central data package prioritization module 104, instead of polling the central data package prioritization module 104 for updates during a temporary data connection.

In one embodiment, the central data package prioritization module 104 receives one or more data packages from the data package sources 102 and/or from the secondary data package source 103. One example of the central data package prioritization module 104 is described in greater detail with regard to the central data package prioritization module 300 of FIG. 3. In general, the central data package prioritization module 104 may be configured to receive a plurality of data packages over a data connection 118, 120 from one or more data package sources 102, 103, to update the central priority matrix 108 based on the plurality of data packages, and to send priority matrix updates over the data connection 118, 120 to the plurality of data package sources 102, 103 as local priority matrix updates. In a further embodiment, the central data package prioritization module 104 may comprise or be otherwise integrated with the secondary data package source 103.

In one embodiment, the data package repository 106 is configured to receive and to store a plurality of data packages from the central data package prioritization module 104. The data package repository 106 may comprise one or more data structures, database tables, files, or the like that are stored on one or more computer readable media. The data package repository 106, in one embodiment, may store entire data packages, or may store selected data from or information about the plurality of data packages.

In one embodiment, the central priority matrix 108 comprises a prioritization of data package types. The central priority matrix 108 may be stored in the data package repository 106, or on one or more other computer readable media accessible to the central data package prioritization module 104. The central priority matrix 108, in one embodiment, may further comprise data that the central data package prioritization module 104 parses from one or more data packages, such as priority indicating data. Priority indicating data may correspond to data package types defined by the central data package prioritization module 104, such that the central data package prioritization module 104 and other modules may compare data from a data package to the priority indicating data in the central priority matrix 108 to determine whether the data package is of a defined data package type, and to determine a priority of the data package.

The central priority matrix 108, in one embodiment, may comprise a data package priority corresponding to each defined data package type. In another embodiment, the central priority matrix 108 may comprise priority indicating data and data package types, and the central data package prioritization module 104 may use the data package types to otherwise access, retrieve, or determine a data package priority corresponding to a specific data package type. In one embodiment, the central priority matrix 108 further comprises one or more received data packages corresponding to each defined data package type.

The central data package prioritization module 104, in one embodiment, may determine, update, or otherwise change the data stored in the central priority matrix 108. The central priority matrix 108, in one embodiment, may comprise rows of data, for example a row of priority indicating data or ranges of data for each defined data package type. In another embodiment, the central priority matrix 108 may comprise a tree structure, for example a decision tree of priority indicating data or ranges of data that the central data package prioritization module 104 may traverse to determine a data package type. In other embodiments, the central priority matrix 108 may comprise another data structure, such as a matrix, list, array, set, map, graph, or the like.

The local priority matrix 116 and the second local priority matrix 117, in one embodiment are local copies of the central priority matrix 108. In a further embodiment, the local priority matrix 116 and the second local priority matrix 117 may comprise one or more customized subsets of the central priority matrix 108. For example, in one embodiment, the secondary data package source 103 may be configured to perform an action no data packages of a predefined data package type, and the second local priority matrix 117 may comprise a subset of the central priority matrix 108 corresponding to the predefined data package type. As described above, the local priority matrix 116 and the second local priority matrix 117 may be updated based on updates to the central priority matrix 108 during temporary connections to the central data package prioritization module 104, in response to a priority matrix update broadcast from the central data package prioritization module 104, or otherwise updated based on the central priority matrix 108.

In one embodiment, the user interface 110 provides the user 112 access to data packages stored in the data package repository 106. The user interface 110 may allow the user 112 to link from one data package of a data package type to other data packages of the data package type. The user interface 110, in another embodiment, may also provide the user 112 access to other information from the central data package prioritization module 104 and/or the data package repository 106, and may allow the user 112 to input data, such as data package type ratings or override priorities, to the central data package prioritization module 104 or the data package repository 106. The user interface 110 may comprises a graphical user interface (GUI), a text interface, or another user interface type. The user 112, in various embodiments, may access the user interface 112 from a single location, from a remote connection, from a local network, from the Internet, and/or from other locations.

In one embodiment, the user 112 is authorized to access the user interface 110. The user 112 may comprise an administrator of the system 100, a technician or support staff assigned to troubleshoot or repair the data package sources 102, a customer that owns, leases, rents, or uses the data package sources 102, or another interested, qualified, and/or authorized party.

Figure 2:
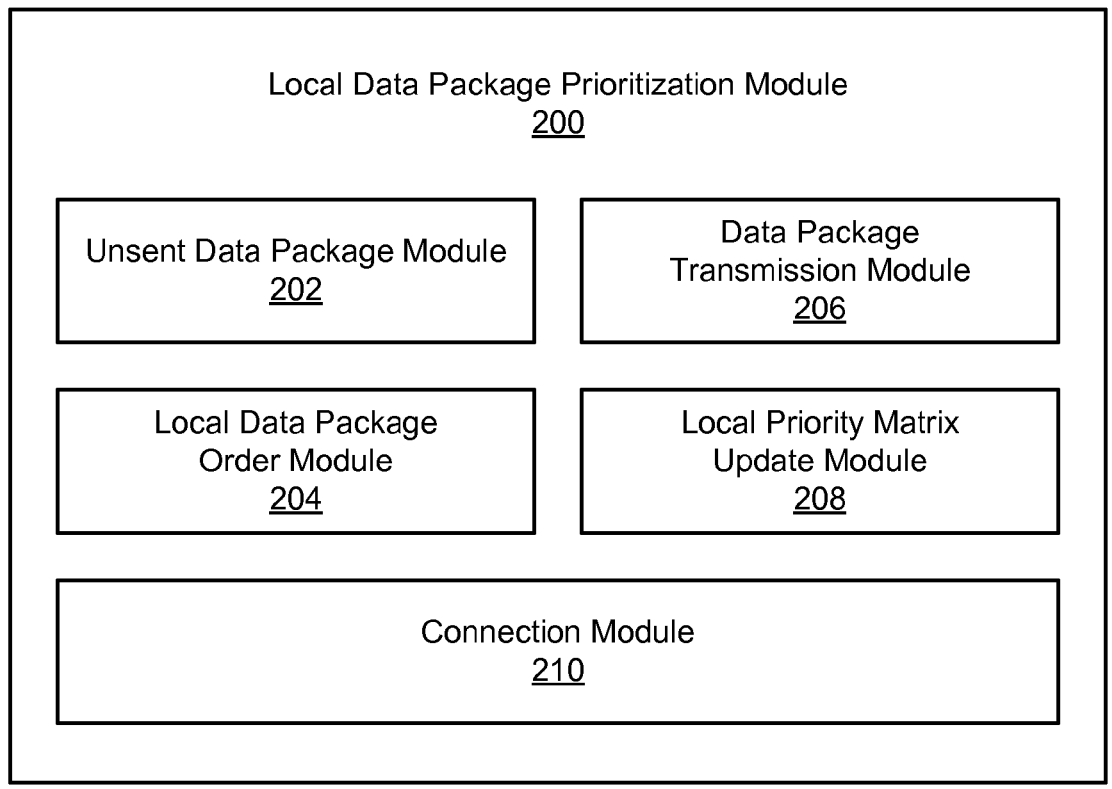
FIG. 2 is a schematic block diagram illustrating one embodiment of a local data package prioritization module in accordance with the present invention.

FIG. 2 depicts one embodiment of a local data package prioritization module 200. In one embodiment, the local data package prioritization module 200 is substantially similar to the local data package prioritization module 114 of FIG. 1. In the depicted embodiment, the local data package prioritization module 200 comprises an unsent data package module 202, a local data package order module 204, a data package transmission module 206, a local priority matrix update module 208, and a connection module 210.

In one embodiment, the unsent data package module 202 collects a plurality of data packages. The unsent data package module 202 may collect the plurality from one or more data package sources, or may collect data to compile the plurality of data packages itself. In a further embodiment, the unsent data package module 202 may determine when the plurality of data packages are to be sent, in response to a predetermined amount of time, a predetermined number of data packages collected, a data package having a predetermined priority, priority indicator, or other attribute, or in response to a signal from another module or device.

The local data package order module 204, in one embodiment determines a prioritized order of the plurality of data packages from the unsent data package module 202 based on a local priority matrix. The local data package order module 204, in a further embodiment, may parse one of more priority indicators from each of the data packages, and compare the one or more priority indicators to entries in the local priority matrix to determine a data package priority of each of the plurality of data packages. In another embodiment, each of the data packages comprises a data package type, and the local data package order module 204 may use the data package types or another identifier from the data packages as a key to locate corresponding data package priorities in the local priority matrix. If the local data package order module 204 determines that a subset of the plurality of data packages have equal priorities, the local data package order module 204, in one embodiment, may arrange the subset based on timestamps. In this way, data packages of equal priorities exhibit a first-in-first-out (FIFO) behavior.

In a further embodiment, a data package from the plurality of data packages may comprise a new data package type not prioritized in the local priority matrix. In one embodiment, the local data package prioritization module 200 may assign the data package a priority based on one or more priority indicators, on a default priority, or the like, or may perform a predefined action on the data package, such as returning it to a data package source, sending it to another module to determine a priority, or the like. In one embodiment, data packages having new data package types are placed at either a beginning of or an end of the prioritized order, based on a predefined default priority.

In one embodiment, the data package transmission module 206 sends the plurality of data packages in the prioritized order either directly or indirectly to a data package repository over a data connection. The data package transmission module 206, in one embodiment, may send the plurality of data packages to the data package repository through one or more secondary data package sources, through a central data package prioritization module, and/or through other devices and modules. In one embodiment, the data connection comprises a temporary data connection initiated by the connection module 210. The data package transmission module 206, in one embodiment, may send a transmission request or the like to the connection module 206 to initiate the data connection. In another embodiment, the data connection comprises a substantially constant data connection.

The local priority matrix update module 208, in one embodiment, updates the local priority matrix based on one or more central priority matrix updates received over the data connection. In one embodiment, the local priority matrix update module 208 sends a local priority matrix update query to a central data package prioritization module or the like, requesting local priority matrix updates based on one or more central priority matrix updates. If there are local priority matrix updates, a central data package prioritization module or the like may send them to the local priority matrix update module 208 over the data connection. In a further embodiment, a central data package prioritization module or the like may send or otherwise broadcast local priority matrix updates to the local priority matrix update module 208 over the data connection in response to updates to the central priority matrix. In one embodiment, the local priority matrix update module 208 receives a complete updated local priority matrix. In another embodiment, the local priority matrix update module 208 receives changes, updates, patches, or the like to the local priority matrix, such as a number of changed or updated rows, entries, objects, or the like.

In one embodiment, the connection module 210 is configured to initiate a data connection to a data package repository. The data connection may be directly with the data package repository, with a module collocated with the data package repository, or with a module in a data path to the data package repository. The connection module 210, may initiate the data connection in response to a transmission request from the data package transmission module 206, in response to a request from another module, in response to a dropped data connection, or otherwise. In another embodiment, the connection module 210 is configured to close the data connection. The connection module 210 may close the data connection in response to a completed communication by the local priority matrix update module 208, a request from another module, a system shutdown event, or otherwise. In one embodiment, the connection module 210 is configured to initiate and/or close a temporary data connection, such as an analog modem connection.

Figure 3:
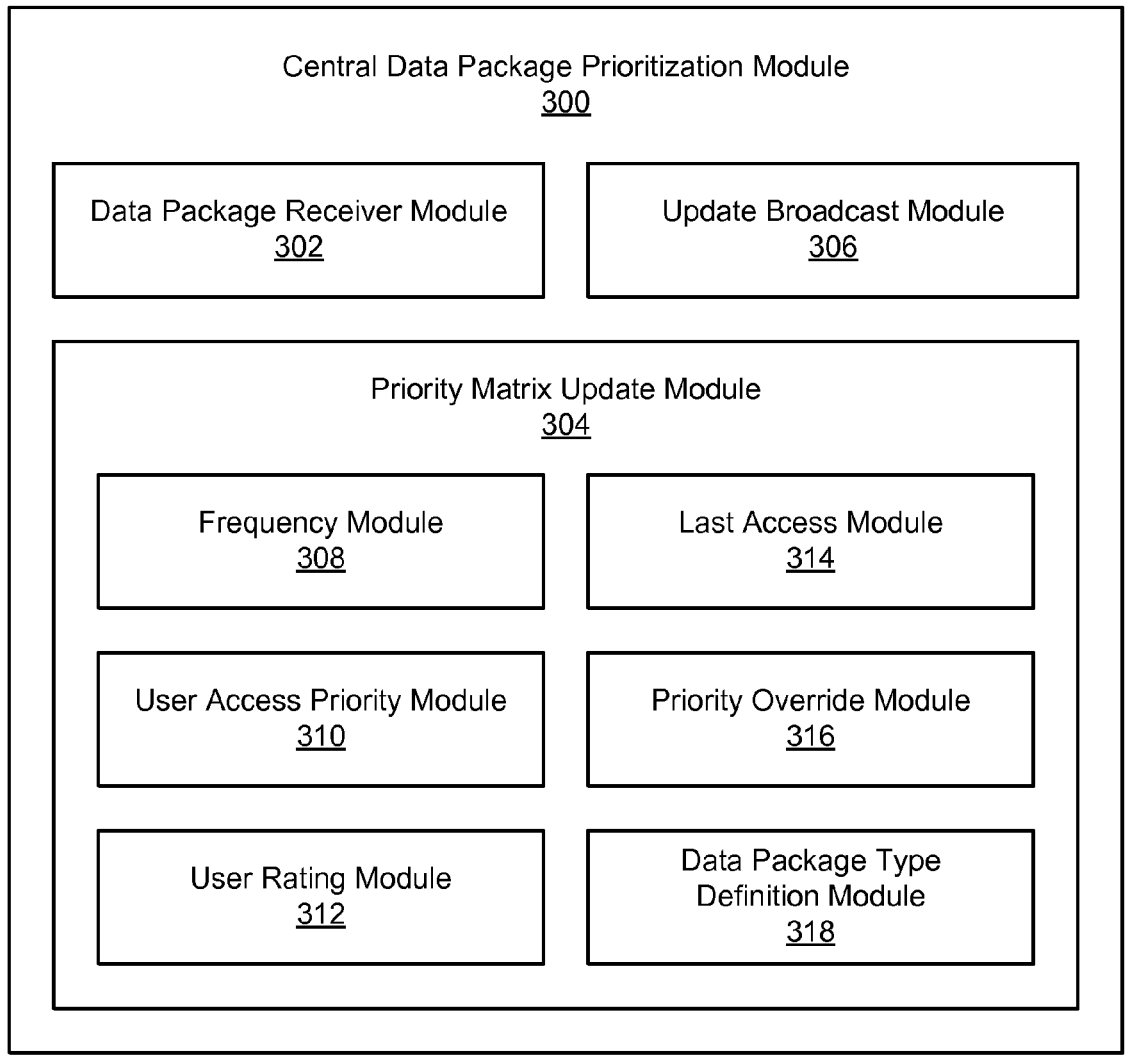
FIG. 3 is a schematic block diagram illustrating one embodiment of a central data package prioritization module in accordance with the present invention.

FIG. 3 depicts one embodiment of a central data package prioritization module 300. In one embodiment, the central data package prioritization module 300 is substantially similar to the central data package prioritization module 104 of FIG. 1. In the depicted embodiment, the central data package prioritization module 300 comprises a data package receiver module 302, a priority matrix update module 304, and an update broadcast module 306.

In one embodiment, the data package receiver module 302 receives a plurality of data packages from one or more data package sources. Data packages within the plurality of data packages, in one embodiment, are in a prioritized order based on one or more local priority matrices. In a further embodiment, the plurality of data packages comprises groupings of data packages from different data package sources, data packages in each grouping in a prioritized order based on a local priority matrix. Data packages within each grouping may have a prioritized order independent of the prioritized order of data packages within other groupings. The data package receiver module 302 may receive data packages over temporary data connections, substantially constant data connections, or other data connections.

In one embodiment, the priority matrix update module 304 updates a central priority matrix. The priority matrix update module 304, in a further embodiment, may update the central priority matrix based on one or more data packages. In the depicted embodiment, the priority matrix update module 304 comprises a frequency module 308, a user access priority module 310, a user rating module 312, a last access module 314, a priority override module 316, and a data package type definition module 318. Each of the frequency module 308, the user access priority module 310, the user rating module 312, the last access module 314, and the priority override module 316, in one embodiment, may update the central priority matrix individually, or may cumulatively provide factors for the priority matrix update module 300 to use in updating the central priority matrix.

In one embodiment, the frequency module 308 updates the central priority matrix at least partially based on a number of data packages of a data package type that the data package receiver module 302 receives. The frequency module 308 may update a data package priority within the central priority matrix based on a percentage of a total number of data packages that the data package receiver module 302 receives that are of a defined data package type, based on one or more predefined thresholds, based on a predefined scale for each received data package of a data package type, or may otherwise factor the number of data packages of a defined data package type received into a data package priority for the data package type within the central priority matrix. In one embodiment, the frequency module 308 increases a data package priority of a data package type as the number of data packages of the data package type that the data package receiver module 302 receives increases.

In one embodiment, the user access priority module 310 updates the central priority matrix at least partially based on a number of times that users have accessed data packages of a data package type. The user access priority module 310 may update a data package priority of the data package type based on a percentage of a total number of user accesses in which users accessed data packages of the data package type, based on one or more predefined user access thresholds, based on a predefined scale for each user access of a data package of the data package type, or may otherwise factor the number of times that users have accessed data packages of the data package type into the data package priority of the data package type within the central priority matrix. In one embodiment, the user access priority module 310 increases the data package priority of the data package type as the number of times that users access data packages of the data package type increases.

In one embodiment, the user rating module 312 updates the central priority matrix at least partially based on one or more user supplied data package priorities. The user rating module 312 may update the data package priority based on an average or other combination of multiple user supplied data package priorities or ratings, based on a single user's data package priority or rating, or may otherwise factor one or more user supplied data package priorities into the data package priority of a data package type within the central priority matrix.

In one embodiment, the last access module 314 updates the central priority matrix at least partially based on an amount of time that has transpired since a data package of a data package type has been accessed. An access, in one embodiment, comprises a user access. In another embodiment, an access may comprise a user access, a module access, or another access of a data package of the data package type. The last access module 314 may update the data package priority of the data package within the central priority matrix based on one or more predefined thresholds, based on a predefined scale for each passing of a selected time division that transpires without an access of a data package of the data package type, or may otherwise factor the amount of time that has transpired since a data package of the data package type has been accessed into the data package priority of the data package type within the central priority matrix. In one embodiment, the last access module 314 decreases the data package priority of the data type within the central priority matrix as the amount of time that has transpired since a data package of the defined data package type has been accessed increases.

In one embodiment, the priority override module 316 overrides a data package priority of a data package type within the central priority matrix. The priority matrix update module 300, in one embodiment, allows the priority override module 316 to override or supersede priority updates to the data package priority of the data package type by other modules. In one embodiment, the priority override module 316 is configured to receive a user supplied priority, or a priority supplied by another module. For example, a user, another module, or the like may designate a static data package priority for a data package type, designate a data package type as a false error, and/or designate a data package type as a severe error. In a further embodiment, the priority override module 316 lowers the data package priority of a data package type within the central priority matrix in response to a false error designation. In another embodiment, the priority override module 316 increases the data package priority of a data package type within the central priority matrix in response to a severe error designation.

In one embodiment, the data package type definition module 318 determines when a data package of the plurality of data packages comprises a new data package type. The data package type definition module 318, in a further embodiment, may determine a data package priority for the new data package type and/or otherwise define attributes of the new data package type. A data package priority, in one embodiment, may comprise an absolute priority, such as a priority level in a tiered priority scale. Each priority level in a tiered priority scale may comprise an identifier, such as a number, letter, symbol, color, or the like to represent the priority level. In another embodiment, a data package priority may comprise a relative priority, such as an ordered ranking of data packages or data package types. In another embodiment, the data package type definition module 318 updates the central priority matrix with the new data package type and/or the data package priority of the new data package type.

The update broadcast module 306, in one embodiment, sends one or more updates from the priority matrix update module 304 over a data connection to one or more data package sources as one or more local priority matrix updates. In one embodiment, the update broadcast module 306 broadcasts the updates over a substantially constant data connection to one or more data package sources in response to updates to a central priority matrix. In another embodiment, the update broadcast module 306 sends the updates over a temporary data connection in response to a local priority matrix update query from a data package source.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
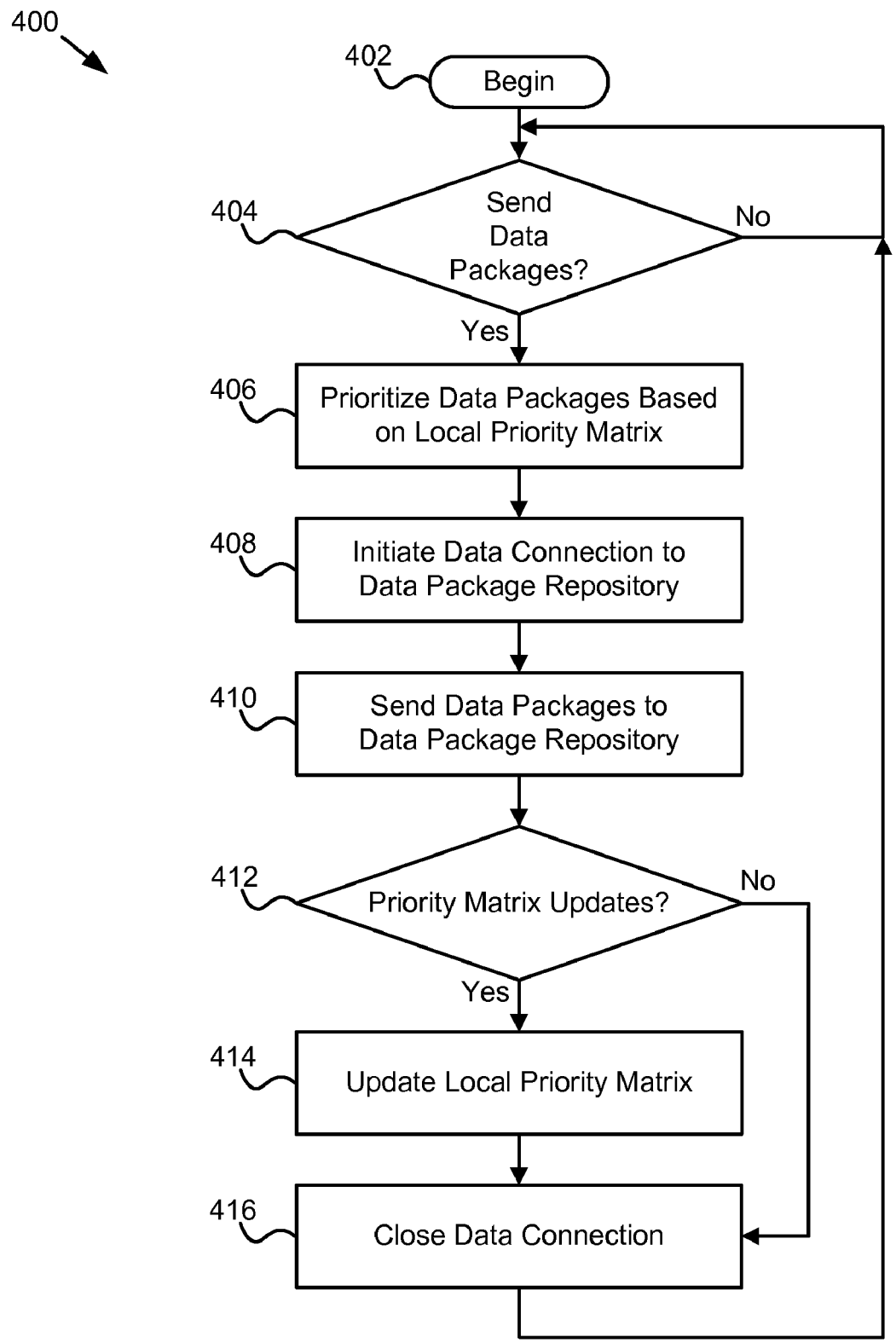
FIG. 4 is a schematic flow chart diagram illustrating one embodiment of a method for automated data determination propagation in accordance with the present invention.

FIG. 4 depicts one embodiment of a method 400 for automated data determination propagation. The method 400 begins 402. The unsent data package module 202 determines 404 whether to send one or more collected data packages. When the unsent data package module 202 determines 404 to send the one or more collected data packages, the local data package order module 204 prioritizes 406 the one or more data packages based on the local priority matrix 116. The connection module 210 initiates 408 a data connection 118 to the data package repository 106. The data package transmission module 206 sends 410 the one or more data packages to the data package repository 106. The priority matrix update module 306 determines 412 whether to update the central priority matrix 108 based on the one or more data packages. In response to a determination 412 to update the central priority matrix 108, the priority matrix update module 306 updates 414 the central priority matrix 108. The connection module 210 closes 416 the data connection 118. The method 400 returns to the send data packages determination step 404.

Figure 5:
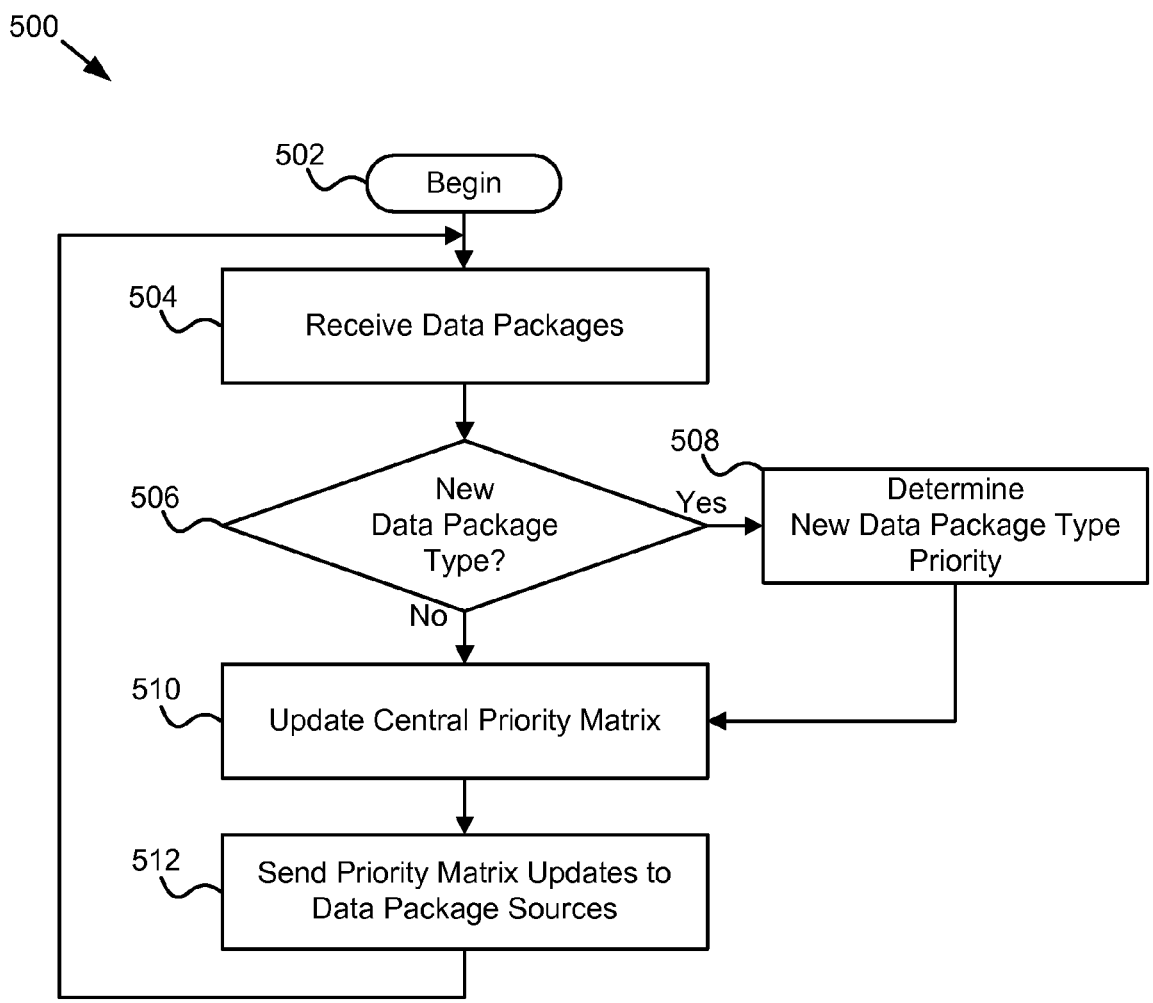
FIG. 5 is a schematic flow chart diagram illustrating another embodiment of a method for automated data determination propagation in accordance with the present invention.

FIG. 5 depicts another embodiment of a method 500 for automated data determination propagation. The method 500 begins 502. The data package receiver module 302 receives 504 one or more data packages from the secondary data package source 103 and/or one or more other data package sources 102. The data package type definition module 318 determines 506 whether the one or more data packages comprise a new data package type. In response to a determination 506 that the one or more data packages comprise a new data package type, the data package type definition module 318 determines 508 a data package priority of the new data package type. The priority matrix update module 306 updates 510 the central priority matrix 108 based on the one or more data packages. The update broadcast module 304 sends 512 one or more updates from the priority matrix update module 306 to the secondary data package source 103 and/or one or more other data package sources 102. The method 500 returns to the receive data packages step 504.

Figure 6:
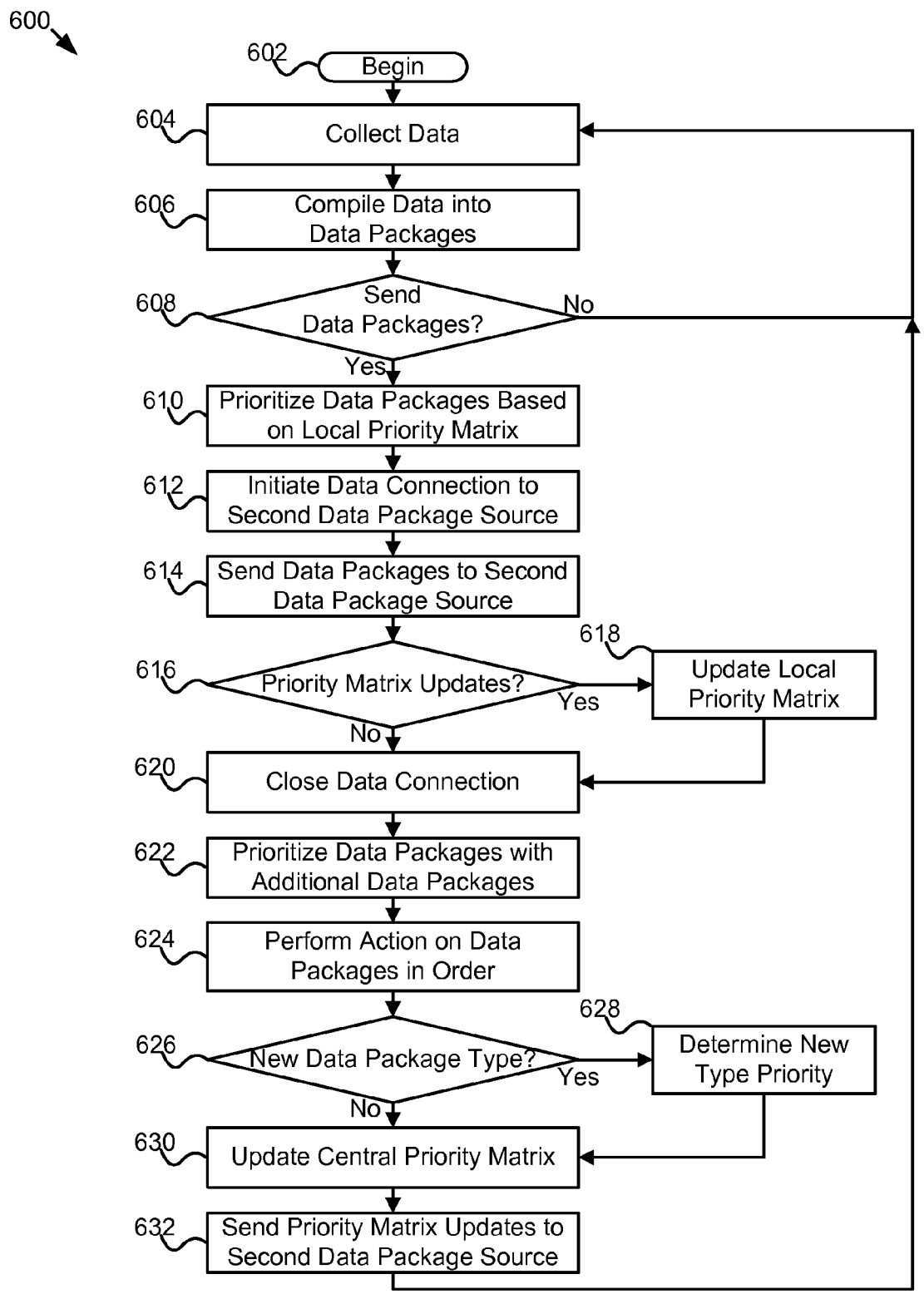
FIG. 6 is a schematic flow chart diagram illustrating a further embodiment of a method for automated data determination propagation in accordance with the present invention.

FIG. 6 depicts a further embodiment of a method 600 for automated data determination propagation. The method 600 begins 602. The unsent data package module 202 collects 604 data. The unsent data package module compiles 606 the data into data packages. The unsent data package module 202 determines 608 whether to send the data packages. In response to a negative determination 608 by the unsent data package module 202, the method 600 returns to the collect data step 604. The local data package order module 204 prioritizes 610 the data packages based on the local priority matrix 116. The connection module 210 initiates 612 the data connection 118 to the secondary data package source 103. The data package transmission module 206 sends 614 the data packages to the secondary data package source 103. The local priority matrix update module 208 queries the central data package prioritization module 104 to determine 616 whether to update the local priority matrix 116 based on the central priority matrix 108. In response to a positive determination 616, the local priority matrix update module 208 updates 618 the local data package prioritization module 114 based on priority matrix updates received from the update broadcast module 304 over the data connection 116. The connection module 210 closes 620 the data connection 118.

The secondary data package source 103 prioritizes 622 the data packages into a prioritized order together with one or more additional data packages. The secondary data package source 103 performs 624 an action on at least a subset of the data packages and the one or more additional data packages in the prioritized order. The data package type definition module 318 determines 626 whether the data packages and/or the one or more additional data packages comprise a new data package type. In response to a determination 626 that the data packages and/or the one or more additional data packages comprise a new data package type, the data package type definition module 318 determines 628 a data package priority of the new data package type. The priority matrix update module 306 updates 630 the central priority matrix 108 based on the data packages and/or the one or more additional data packages. The update broadcast module 304 sends 632 one or more priority matrix updates from the priority matrix update module 306 to the secondary data package source 103. The method 600 returns to the collect data step 604.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for data determination propagation, the apparatus comprising:
   an unsent data package module configured to collect a plurality of data packages;
   a local data package order module configured to determine a prioritized order of the plurality of data packages based on a local priority matrix;
   a data package transmission module configured to send the plurality of data packages in the prioritized order to a data package repository over a data connection;
   a local priority matrix update module configured to update the local priority matrix based on one or more central priority matrix updates received over the data connection; and
   a connection module configured to initiate the data connection to the data package repository in response to a transmission request from the data package transmission module, the connection module further configured to close the data connection in response to a completed communication by the local priority matrix update module;
   wherein the unsent data package module, the local data package order module, the data package transmission module, the local priority matrix update module, and the connection module comprise one or more of logic hardware and executable code, the executable code stored on a non-transitory computer readable storage medium.

2. The apparatus of claim 1, wherein the data connection comprises an analog modem connection.

3. The apparatus of claim 1, wherein the local data package order module is further configured to arrange a subset of the plurality of data packages in order based on timestamps of the subset of the plurality of data packages in response to a determination that each data package in the subset of the plurality of data packages has an equal priority in the local priority matrix.

4. An apparatus for data determination propagation, the apparatus comprising:
   a data package receiver module configured to receive a plurality of data packages over a data connection from one or more data package sources, each of the data package sources configured to send at least a subset of the plurality of data packages to the data package receiver module in a prioritized order based on a local priority matrix;
   a priority matrix update module configured to update a central priority matrix based on the plurality of data packages, the central priority matrix comprising a prioritization of data package types; and
   an update broadcast module configured to send updates from the priority matrix update module over the data connection to the plurality of data package sources as local priority matrix updates;
   wherein the data package receiver module, the priority matrix update module, and the update broadcast module comprise one or more of logic hardware and executable code, the executable code stored on a non-transitory computer readable storage medium.

5. The apparatus of claim 4, wherein the priority matrix update module comprises a frequency module configured to update the central priority matrix based at least partially on a number of the plurality of data packages having a similar data package type.

6. The apparatus of claim 4, wherein the priority matrix update module comprises a user access priority module configured to update the central priority matrix based at least partially on a number of times that data packages of a similar data package type have been accessed by one or more users.

7. The apparatus of claim 4, wherein the priority matrix update module comprises a user rating module configured to update the central priority matrix based at least partially on one or more user supplied data package priorities.

8. The apparatus of claim 4, wherein the priority matrix update module comprises a last access module configured to update the central priority matrix based at least partially on an amount of time that has transpired since a data package of a data package type has been accessed.

9. The apparatus of claim 4, wherein the priority matrix update module comprises a priority override module configured to update the central priority matrix based at least partially on a user-provided override data package priority.

10. The apparatus of claim 4, wherein the data connection comprises a substantially constant data connection.

11. The apparatus of claim 4, wherein the plurality of data packages comprises a plurality of error reports, and further wherein the prioritization of data package types comprises an error severity prioritization.

12. The apparatus of claim 4, wherein at least one data package source from the plurality of data package sources comprises a dumper module configured to transmit data packages between servers in the prioritized order.

13. The apparatus of claim 4, wherein at least one data package source from the plurality of data package sources comprises an unpacker module configured to parse and unpack data packages in the prioritized order.

14. A system for data determination propagation, the system comprising:
- a data package source configured to collect call home data and to compile the call home data into call home packages;
- a local data package prioritization module configured to determine a prioritized order of the call home packages based on a local priority matrix, to send the call home packages in the prioritized order over a temporary data connection, and to update the local priority matrix over the temporary data connection based on a central priority matrix;
- a central data package prioritization module configured to receive the call home packages and to make one or more updates to the central priority matrix based on the call home packages; and
- a data package repository configured to store the call home packages;
- wherein the data package source, the local data package prioritization module, the central data package prioritization module, and the data package repository comprise one or more of logic hardware and executable code, the executable code stored on a non-transitory computer readable storage medium.

15. The system of claim 14, further comprising a secondary data package source configured to determine a secondary prioritized order of at least a subset of the call home packages and one or more additional call home packages based on a second local priority matrix, to perform an action on at least a subset of the call home packages and the additional call home packages in the secondary prioritized order, and to update the second local priority matrix over a substantially constant data connection based on the central priority matrix.

16. The system of claim 15, wherein the central data package prioritization module is further configured to broadcast the one or more updates over the substantially constant data connection to the secondary data package source.

17. The system of claim 14, further comprising a user interface configured to provide a user access to the call home packages stored in the data package repository.

18. A computer program product comprising a non-transitory computer readable storage medium storing computer usable program code executable by a computer to perform operations for data determination propagation, the operations of the computer program product comprising:
- receiving a plurality of error records from one or more data package sources in a prioritized order based on a local priority matrix;
- determining whether an error record from the plurality of error records comprises a new error type;
- determining an error priority of the new error type;
- making one or more updates to a central priority matrix based on the error priority of the new error type; and
- sending the one or more updates to at least one of the one or more data package sources as local priority matrix updates.

19. The computer program product of claim 18, further comprising receiving a local priority matrix update query from the at least one of the one or more data package sources.

* * * * *